No. 875,654. PATENTED DEC. 31, 1907.
J. CHRISTENSEN.
BALE TYING ATTACHMENT.
APPLICATION FILED SEPT. 10, 1906.
2 SHEETS—SHEET 2.
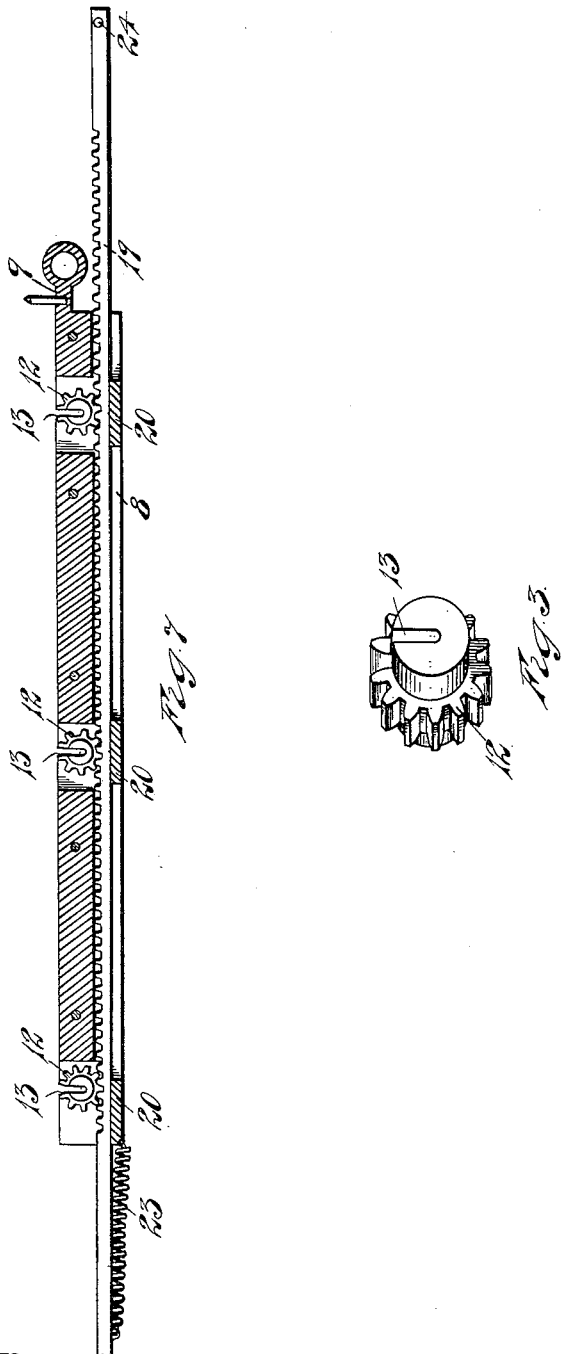
WITNESSES
INVENTOR
John Christensen
By
Parker & Burton Attorneys.

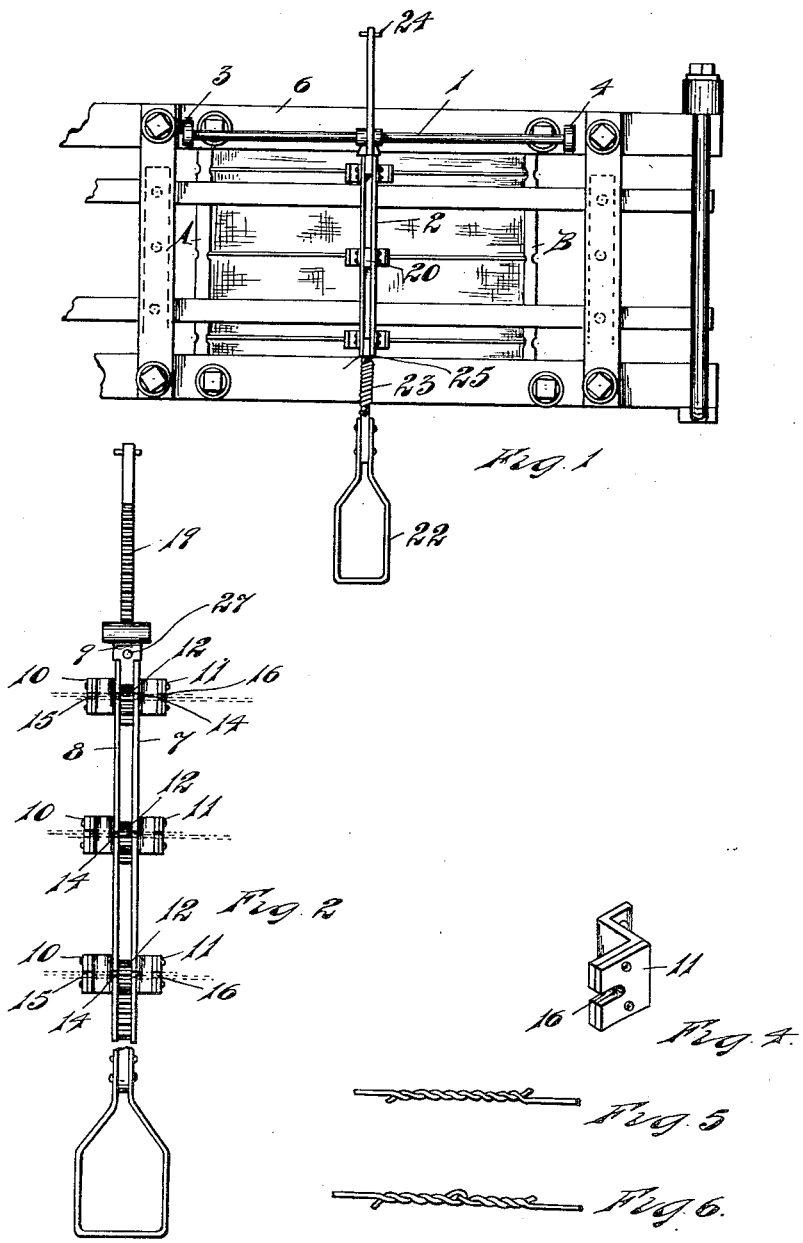

UNITED STATES PATENT OFFICE.

JOHN CHRISTENSEN, OF ANN ARBOR, MICHIGAN, ASSIGNOR TO YPSILANTI HAY PRESS CO., OF YPSILANTI, MICHIGAN.

BALE-TYING ATTACHMENT.

No. 875,654.      Specification of Letters Patent.      Patented Dec. 31, 1907.

Application filed September 10, 1906. Serial No. 333,973.

*To all whom it may concern:*

Be it known that I, JOHN CHRISTENSEN, a citizen of the United States, residing at Ann Arbor, county of Washtenaw, State of Michigan, have invented a certain new and useful Improvement in Bale-Tying Attachments, and declare the following to be a full, clear, and exact description of the same, such as will enable others skilled in the art to which it pertains to make and use the same, reference being had to the accompanying drawings, which form a part of this specification.

This invention relates to a bale tying attachment to hay presses.

It has for its object an improved attachment adapted to be placed on any hay press of ordinary construction and is to be used for the purpose of securing together the ends of the bale wire by which the bale is bound.

In the drawing:—Figure 1, shows an elevation of the bale delivery chamber of a hay press with the attachment secured thereto. Fig. 2, is a reverse view of the attachment on an enlarged scale. Fig. 3, is a perspective of the twist wheel. Fig. 4, is a perspective of the wire holding jaw. Fig. 5, shows two ends of wire twisted together. Fig. 6, shows two ends of wire looped together and twisted. Fig. 7 is a vertical section through the center portion of Fig. 2, and at right angles to the plane of that Fig., showing the rack and pinion engagements and the returning spring.

To one of the frame timbers 6 which inclose the delivery chamber of a hay press is secured a rod 1 which supports and guides a hanging frame 2. The supports 3 and 4 of the rod are brackets which hold the rod parallel to, but spaced from, the timber 6. The frame 2 consists of two parallel bars 7 and 8 secured at their upper end to a head 9 that is provided with an eye to engage on the rod 1. At intervals below the head 9 are secured side brackets 10 and 11 which are spaced along the bars to correspond with the location at which it is proposed to place the bale ties around the bale. These brackets are in pairs and are opposite to each other; journaled between each pair of brackets on the frame bars 7 and 8 is a wheel 12 provided with gear teeth and with a notch 13 that extends into the wheel to and slightly beyond the center thereof and extends into the journals which project at each side from the face of the wheel. A corresponding notch 14 is cut in each of the frame bars 7 and 8 leading into the notch 13 and the corresponding notches 15 and 16 are cut in the brackets 10 and 11. There is thus provided entirely across the frame and the brackets connected with it, a passage in which the ends of the tie wire may be laid with the central part of the overlap of the two ends of the wire lying substantially at the center of the wheel 12.

A rack 19 engages along the frame and is in position to actuate and rotate the several wheels 12; the rack is held in place by yokes 20 which extend across from the side piece 10 to the side piece 11 at each pair of brackets, thus holding the rack securely in place and preventing it from springing away from engagement with either of the wheels with which it engages. The rack is provided with a foot stirrup 22 by means of which it is forced downward and is retracted by means of a spring 23 when the pressure of the foot is removed. The stops 24 and 25 limit the throw of the rack and cause it to stop with the notches 13 in the proper position. On the up-stroke, the notch should stop exactly opposite the notch in the frame piece; on the down-stroke, the wheels should overthrow the notches in the frame by about the thickness of the wire and when the pressure of the foot is removed, the spring of the wire will bring the notch of the wheel to the proper place with respect to the notch in the frame to readily disengage the now twisted wires from the attachment. At the upper end of the attachment near the head 9 is a small pointed pin 27 which engages in the hay of the bale and causes the attachment to travel with the bale during the progress of the bale through the delivery chamber.

In practice, the operator moves the attachment toward the receiving end of the delivery chamber (to the left in the drawing) and drops it against a bale at a time when the bar is midway between two division boards A and B. The wires with which the bale is to be bound are then passed along the grooves in the division boards to bring the two free ends of the wires to the near side of the bale; the ends of the wires are then crossed over the attachment and the now parallel lying ends of the wires are dropped into the notches in the frame and into the notch in the wheel. All of the wires of the several bale bands may be engaged in the attachment at the same time or only a single pair of overlapping ends as may be desired; after the ends of one or more of the bale bands have been caught in the notches, the workman pulls down the rack with his foot, releases the rack which is returned by the spring, swings the lower end or hanging end of the attachment out from the press, releases the wires and carries the attachment back to its original location for work on a new bale.

By the operation of the machine, the two ends of the wires have been given a double twist, and have been given two, three or four turns depending upon the position at which the downward pressure ceased. The bale band is perfectly secured, no superfluous wire has been necessary beyond that which is sufficient to pass once around the bale and lap at the ends just across from the bracket 10 to the bracket 11. The two wires may be linked together and twisted, as shown in Fig. 6, by looping the wires together and bending each end back on itself with the two bent parts interlinked and placing the thus interlinked wires in the twisting wheel and operating the twisting wheel as previously explained.

What I claim is:—

1. A bale fastening attachment for hay presses, having in combination a supporting, bracket, a hanger adapted to slide therealong, notched wire-receiving brackets at intervals along said hanger, rotatable wheels journaled opposite each of said brackets, each having a notched portion extending from its periphery to the center adapted to register with the complementary part of its bracket, and means for simultaneously actuating said wheels, substantially as described.

2. A bale band fastening attachment for hay presses, having in combination a track, a hanger adapted to travel on said track, wire holding brackets secured to said hanger, a wire twisting wheel journaled between said brackets, the said wire twisting wheel being provided with a notch extending through a side thereof into said wheel to the center thereof, and means for rotating said wheel, substantially as described.

3. A wire twisting attachment for hay presses, having in combination with a supporting trackway fixed members adapted to travel therealong and to hold the lapping ends of a bale wire, a rotating member journaled between said fixed members adapted to engage the parallel lapping ends of a bale wire intermediate the fixed holding members, and means for actuating the rotating member, substantially as described.

4. In combination with a supporting track, a frame adapted to travel therealong, said frame having notched wire-engaging portions at intervals along its length, gear wheels each having an indentation of greater depth than the toothed peripheral portion journaled in said frame, in position for the registry of the indented portion with one of the notched portions of the frame, and a rack slidably supported by said frame with its teeth in engagement with said gear wheels, whereby the same may be actuated, substantially as described.

In testimony whereof, I sign this specification in the presence of two witnesses.

JOHN CHRISTENSEN.

Witnesses:
 ALICE TOWNSEND,
 LOTTA LEE HAYTON.